US012395518B1

(12) United States Patent
Zhang et al.

(10) Patent No.: US 12,395,518 B1
(45) Date of Patent: Aug. 19, 2025

(54) SYSTEM AND METHOD FOR ACHIEVING SYSTEM XSS PREVENTION IN COMPONENTIZED FORM

(71) Applicant: Three Gorges Hi-Tech Information Technology Co., Ltd, Wuhan (CN)

(72) Inventors: Chen Zhang, Wuhan (CN); Yunpeng Chen, Wuhan (CN); Xiaobo Li, Wuhan (CN); Shengshun Qiu, Wuhan (CN); Jiandong Wang, Wuhan (CN); Yi Yao, Wuhan (CN); Huizhi Qin, Wuhan (CN); Qingfeng Chen, Wuhan (CN); Huimin Xie, Wuhan (CN)

(73) Assignee: Three Gorges Hi-Tech Information Technology Co., Ltd, Wuhan (CN)

( * ) Notice: Subject to any disclaimer, the term of this patent is extended or adjusted under 35 U.S.C. 154(b) by 0 days.

(21) Appl. No.: 18/882,395

(22) Filed: Sep. 11, 2024

Related U.S. Application Data

(63) Continuation of application No. PCT/CN2024/108060, filed on Jul. 29, 2024.

(30) Foreign Application Priority Data

Apr. 19, 2024 (CN) .......................... 202410472768.2

(51) Int. Cl.
*H04L 9/00* (2022.01)
*H04L 9/40* (2022.01)
(52) U.S. Cl.
CPC ...... *H04L 63/1433* (2013.01); *H04L 63/1425* (2013.01); *H04L 63/306* (2013.01)
(58) Field of Classification Search
CPC .......................... H04L 63/1433; H04L 63/1425
(Continued)

(56) References Cited

U.S. PATENT DOCUMENTS 8,578,482 B1 * 11/2013 Yang ...................... G06F 21/51
726/22
10,834,102 B2 * 11/2020 Johns .................. H04L 63/1433
(Continued)

FOREIGN PATENT DOCUMENTS

CN 104182685 A 12/2014
CN 106790007 A 5/2017
(Continued)

OTHER PUBLICATIONS

Notification to Grant Patent Right for Invention issued in counterpart Chinese Patent Application No. 202410472768.2, dated May 31, 2024.
(Continued)

*Primary Examiner* — Christopher J Brown
(74) *Attorney, Agent, or Firm* — Westbridge IP LLC (57) ABSTRACT

Disclosed are a system and a method for achieving system cross-site scripting (XSS) prevention in a componentized form. The system includes: a request message receiving module, configured to receive a request message; a thread data enable judgment module, configured to enable thread data to acquire a thread data enable state when judging that interception on the request message is required; an annotation retrieval and storage module, configured to store a preset filter annotation in a class of the request message in the thread data to acquire final thread data; a component creation module, configured to generate a XSS prevention component based on the thread data enable state and the final thread data; an intercept data determination module, configured to acquire intercepted request thread data based on the XSS prevention component; and an intercept prevention execution module, configured to delete the intercepted request thread data and return a request result.

8 Claims, 3 Drawing Sheets

(58) Field of Classification Search
USPC .......................................................... 726/22
See application file for complete search history.

(56)  References Cited

U.S. PATENT DOCUMENTS

| | | | | |
|---|---|---|---|---|
| 12,045,610 | B1* | 7/2024 | Myers | .................... G06N 20/00 |
| 2017/0353434 | A1* | 12/2017 | Al-Saber | ............... H04L 63/168 |
| 2020/0351298 | A1* | 11/2020 | Paturi | ...................... G06F 21/54 |
| 2022/0014561 | A1* | 1/2022 | Caceres | .............. H04L 63/1425 |
| 2022/0321483 | A1 | 10/2022 | Zacks et al. | |

FOREIGN PATENT DOCUMENTS

| | | | |
|---|---|---|---|
| CN | 113190845 | A | 7/2021 |
| CN | 113486326 | A | 10/2021 |
| CN | 113722756 | A | 11/2021 |
| CN | 117424723 | A | 1/2024 |

OTHER PUBLICATIONS

Pan et al., Finding XSS Vulnerabilities Based on Statie Analysis and Dynamie Testing, Computer Science, vol. 39, No. 6A, pp. 51-53 and 85, dated Jun. 15, 2012.

Wang et al., Design and Research of Anti XSS Bypass Filtering Rules, Computer & Digital Engineering, vol. 46, No. 4, pp. 788-792, dated Apr. 20, 2018.

* cited by examiner

SYSTEM AND METHOD FOR ACHIEVING SYSTEM XSS PREVENTION IN COMPONENTIZED FORM

CROSS-REFERENCE TO RELATED APPLICATIONS

This application is a continuation of International Application No. PCT/CN2024/108060, filed on Jul. 29, 2024, which claims priority to Chinese Patent Application No. 202410472768.2, filed on Apr. 19, 2024. All of the aforementioned applications are incorporated herein by reference in their entireties.

TECHNICAL FIELD

The present disclosure relates to the technical field of cyber security, and in particular to a system and a method for achieving system XSS prevention in a componentized form.

BACKGROUND

Currently, cross-site scripting (XSS) attacks are the most common Web attacks and code injection attacks. Attackers inject malicious scripts on a target website and allow the malicious scripts to run on a user's browser. The attackers can obtain user's sensitive information such as Cookie and SessionID by using these malicious scripts, thus endangering data security. In a Jave Web application program, XSS prevention is basically achieved by using a filter. As a component in Jave Servlet specifications, the filter may perform intervention processing and modifications on a request and response before the request reaches Servlet or responds to a client. A brief process for achieving the XSS prevention based on the filter includes: creating a filter class, to achieve a javax.servlet. Filter interface and achieve a doFilter method; creating a HttpServletRequest wrapper class, used to perform filtering XSS processing on an input after acquiring a parameter. Different XSS filter methods can be used in this process according to specific needs, and for example, a regular expression is used for replacement or a third-party XSS filter bank is used. S3: this filter is enabled in the Jave web application program.

The Java XSS prevention component achieved based on the filter exists the following issues: firstly, XSS processing strategies do not support custom configurations of classes/methods/field levels, thus not providing code-level control and not meeting developer's needs in response to complex application scenarios, such as field level ignores, field level XSS custom configuration. Secondly, some special scenarios are not supported, for example, when a receiving parameter is a multi-level nesting object, the field control cannot be supported, and when a transfer parameter is a rich-text content, a certain specific label and the like are processed and issued in a custom form.

Therefore, the present disclosure proposes a system and a method for achieving system XSS prevention in a componentized form.

SUMMARY

The present disclosure provides a system and a method for achieving system XSS prevention in a componentized form, enabling that XSS processing strategies based on the interceptor support custom configurations of classes/methods/field levels; providing a preset filter annotation, which facilitates developer realization of code-level control, such as field level ignores, field level XSS custom configuration; and providing an extended mode for the custom XSS processing, whereby the developers can implement XSS processing strategies by themselves based on specific business scenarios. When a receiving parameter is a multi-level nesting object, the field level control is supported by annotating a transfer parameter, for example, the multi-level nesting student and course objects of a Person object can implement sex, student.course.teacher fine-grained control through method level annotation and the transfer parameter @XSSIgnore (value= {"sex", "student.course.teacher"}). A tag library function is implemented, and the developers can customize a particular tag that needs to be released or processed, to support the application scenarios of the rich text.

The present disclosure provides a system for achieving system XSS prevention in a componentized form, including:
a request message receiving module, configured to receive a request message sent from a client;
a thread data enable judgment module, configured to enable thread data to acquire a thread data enable state when judging that interception on the request message is required based on a routing control strategy of a user-defined Web application interceptor;
an annotation retrieval and storage module, configured to judge whether a preset filter annotation exists in a class involved in the request message or not, if so, the preset filter annotation existing in the class involved in the request message is stored in the thread data, thus obtaining the final thread data;
a component creation module, configured to generate a XSS prevention component based on the thread data enable state and the final thread data;
an intercept data determination module, configured to perform XSS prevention processing on the request message based on the XSS prevention component, and then to acquire intercepted request thread data; and
an intercept prevention execution module, configured to delete the intercepted request thread data and to return a request result.

Preferably, the request message receiving module includes:
a first receiving submodule, configured to receive a request message of a hypertext transfer protocol (HTTP) sent from the client; and
a second receiving submodule, configured to receive a request message of a hypertext transfer protocol secure (HTTPS) sent from the client.

Preferably, the thread data enable judgment module includes:
an intercept judgment submodule, configured to judge whether the interception on the request message is required or not based on the routing control strategy of the user-defined Web application interceptor and a behavior analysis and judgment result of the request message, and then to acquire an intercept judgment result;
a first judgment submodule, configured to enable the thread data when the intercept judgment result is that the interception on the request message is required, where the enable thread data serves as the thread data enable state; and
a second judgment submodule, configured to not enable the thread data when the intercept judgment result is that the interception on the request message is not required, where the unenabled thread data serves as the thread data enable state.

Preferably, the intercept judgment submodule includes:
a behavior analysis and judgment unit, configured to perform behavior analysis and judgment on the request message, and to acquire the behavior analysis and judgment result of the request message;
a decision unit requiring interception, configured to serve the interception on the request message as an interception judgment result when the behavior analysis and judgment result of the request message is that the request message exists aggression or the routing control strategy of the Web application interceptor is hit by the request message; and
a decision unit not requiring interception, configured to serve the interception not required on the request message as an interception judgment result when the behavior analysis and judgment result of the request message is that the request message does not exist aggression and the routing control strategy of the Web application interceptor is not hit by the request message.

Preferably, the behavior analysis and judgment unit includes:
a step aggression assessment subunit, configured to perform an aggression assessment on each execution step in a request execution task of the request message, and to acquire an attack performance value of each execution step in the request message;
an aggression step primary subunit, configured to serve an execution step that the attack performance value in the request execution task exceeds an attack performance threshold as a suspected attack behavior step;
a logic tree building subunit, configured to determine an execution logic tree of the request execution task based on execution logics of all execution steps in the request execution task;
a comprehensive attack performance assessment subunit, configured to assess a comprehensive attack performance value of the request execution task of the request message based on distribution characteristics and attack performance values of all suspected attack behavior steps of the request execution task in the execution logic tree;
a first behavior analysis and decision subunit, configured to serve the request message existing aggression as the behavior analysis and judgment result of the request message when a comprehensive attack performance value of the request execution task of the request message is not less than a comprehensive attack performance threshold; and
a second behavior analysis and decision subunit, configured to serve the request message not existing aggression as the behavior analysis and judgment result of the request message when the comprehensive attack performance value of the request execution task of the request message is less than the comprehensive attack performance threshold.

Preferably, the step aggression assessment subunit includes:
an assessment model building end, configured to acquire a preset step aggression assessment model; and
a step aggression assessment end, configured to input each execution step of the request execution task in the request message to the preset step aggression assessment model, to acquire an attack performance value of each execution step in the request message.

Preferably, the comprehensive attack performance assessment subunit includes:
a tree structural topology screening end, configured to determine all suspected attack behavior step topological structures with maximally continuous levels when executing all topological sorting in the logic tree;
an assessment weight determination end, configured to serve a quotient of a difference value between a maximum level number of the execution logic tree and a minimum level tree in each suspected attack behavior step topological structure with the maximum level number of the execution logic tree as an aggression assessment weight of each suspected attack behavior step topological structure;
a subcomprehensive attack performance determination end, configured to serve a product of a sum of attack performance values of all suspected attack behavior steps in each suspected attack behavior step topological structure with the corresponding aggression assessment weight as a subcomprehensive attack performance value of each suspected attack behavior step topological structure; and
a comprehensive attack performance determination end, configured to serve a sum of the subcomprehensive attack performance values of all suspected attack behavior step topological structures in the execution logic tree as the comprehensive attack performance value of the request execution task of the request message.

Preferably, the annotation retrieval and storage module includes:
a class inspection submodule, configured to judge whether a @XSS annotation or/and a @XSSIgnore annotation in the preset filter annotation exists in the class involved in the request message or not, if so, a thread local variable object in a subclass of a ThreadLocal type is called from a thread data pool; and
a gradual storage submodule, configured to store the @XSS annotation or/and the @XSSIgnore annotation existing in the class involved in the request message in current thread data in a key-value pair mapping set of the thread local variable object of the ThreadLocal type, and to obtain the final thread data.

Preferably, the component creation module includes:
a first creation submodule, configured to generate a XSS prevention component based on the preset filter annotation stored in the thread data, a creation method level XSSConfig object and a method level XSSConfig object when the enabling of the thread data is judged based on the thread data enable state at parameter formatting or deserialization; and
a second creation submodule, configured to generate a XSS prevention component based on a Java Web default global XSS configuration when the unenabling of the thread data is judged based on the thread data enable state at parameter formatting or deserialization.

The present disclosure provides a method for achieving system XSS prevention in a componentized form, applied in the system for achieving system XSS prevention in a componentized form according to the system described above, and the method includes:
S1: receiving a request message sent from a client;
S2: enabling thread data to acquire a thread data enable state when interception required to the request message is judged based on a routing control strategy of a user-defined Web application interceptor;
S3: judging whether a preset filter annotation exists in a class involved in the request message or not, if so, the preset filter annotation existing in the class involved in the request message is stored in the thread data, thus obtaining the final thread data;

S4: generating a XSS prevention component based on the thread data enable state and the final thread data;

S5: performing XSS prevention processing on the request message based on the XSS prevention component, and then acquiring intercepted request thread data; and S6: detecting the intercepted request thread data, and returning a request result.

Compared with the prior art, the present disclosure has the following beneficial effects: enabling that XSS processing strategies based on the interceptor support custom configurations of classes/methods/field levels; providing a preset filter annotation, which facilitates developer realization of code-level control, such as field level ignores, field level XSS custom configuration; and providing an extended mode for the custom XSS processing, whereby the developers can implement XSS processing strategies by themselves based on specific business scenarios. When a receiving parameter is a multi-level nesting object, the field level control is supported by annotating a transfer parameter, for example, the multi-level nesting student and course objects of a Person object can implement sex, student.course.teacher fine-grained control through method level annotation and the transfer parameter @XSSIgnore (value= {"sex", "student.course.teacher"}). A tag library function is implemented, and the developers can customize a particular tag that needs to be released or processed, to support the application scenarios of the rich text.

Other features and advantages of the present disclosure will be explained in the following specification, and some will be apparent in the specification or be understood through implementing the present disclosure. The purpose and other advantages of the present disclosure may be implemented and obtained through the structure specially pointed out in this application.

The technical solution of the present disclosure is further described in detail below in combination with the drawings and the embodiments.

BRIEF DESCRIPTION OF THE DRAWINGS

The drawings are used to provide a further understanding of the present disclosure, and constitute a part of the specification, which is used to explain the present disclosure together with the embodiments of the present disclosure, but do not constitute limitations to the present disclosure. In the drawings.

DETAILED DESCRIPTION OF THE EMBODIMENTS

The preferred embodiments of the present disclosure are described below in combination with drawings. It is understood that the preferred embodiments described herein are merely used for describing and explaining the present disclosure, instead of limiting the present disclosure.

Embodiment 1

Figure 1:
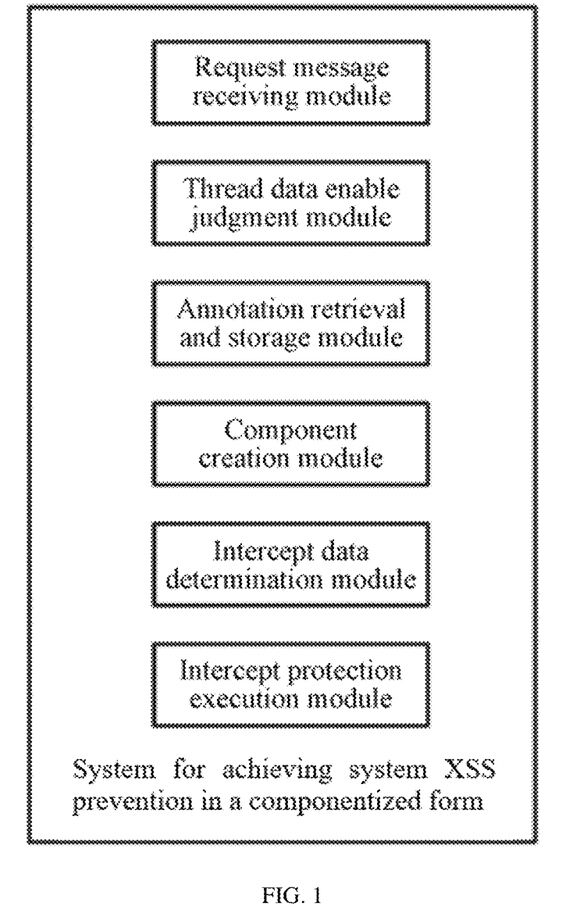
FIG. 1 is a schematic diagram of an internal function module of a system for achieving system XSS prevention in a componentized form in embodiments of the present disclosure.

The present disclosure provides a system for achieving system cross-site scripting (XSS) prevention in a componentized form, and with reference to FIG. 1, the system includes:

a request message receiving module, configured to receive a request message sent from a client;

a thread data enable judgment module, configured to enable thread data to acquire a thread data enable state when interception required to the request message is judged based on a routing control strategy of a user-defined Web application interceptor;

an annotation retrieval and storage module, configured to judge whether a preset filter annotation exists in a class involved in the request message or not, if so, the preset filter annotation existing in the class involved in the request message is stored in the thread data, thus obtaining the final thread data;

a component creation module, configured to generate a XSS prevention component based on the thread data enable state and the final thread data;

an intercept data determination module, configured to perform XSS prevention processing on the request message based on the XSS prevention component, and then to acquire intercepted request thread data; and an intercept prevention execution module, configured to delete the intercepted request thread data and to return a request result.

In this embodiment, the client is a communication terminal sending a request to the system, and may be a malicious attacker for injecting attacks by codes.

In this embodiment, the routing control strategy of the Web application interceptor is a user-defined Web application firewall rule;

the Web application interceptor is a cyber security tool and may be used to prevent an unauthorized request from entering the Web application program. The interceptor is usually deployed at a server terminal of the Web application program, to monitor a hypertext transfer protocol (HTTP) request and execute a predefined logic, for example, rejecting a suspicious request and limiting an access to a specific Internet protocol (IP) address or executing other security inspection. The interceptor is generally used together with the routing control strategy, to further limit which requests will be allowed to be approved by the Web application program;

the routing control strategy refers to a method for determining which requests will be routed to different parts of the Web application program. Whether or not to forward a request to a specific processing program or a page may be decided based on an uniform resource locator (URL) parameter, a request header, a user identity and other factors. The routing control strategy may be used in combination with the interceptor, to ensure that only valid and secure requests can reach different parts of the Web application program.

Some common routing control strategies of the Web application interceptor include:

URL path matching: only the request of a specific type is allowed to be approved, such as a limited user, date scope or type;

request header matching: only some types of requests are allowed to be approved, such as a limited User-Agent header, a Referer header or Content-Type;

User identity authentication: the user is required to log in and provide a verification code, to prevent the unauthorized request;

Session tracking: recording each request and forwarding the request to a suitable processing program or page;

IP lockup: preventing the request from the specific IP address according to a blacklist or a whitelist; and Use in combination with other filters, such as, screening the request according to a request timestamp or size.

In this embodiment, the called thread data in a XSS attack refers to user session identifiers that a hacker acquires by using a XSS vulnerability, and the session identifiers are usually the user cookie ID, session ID or other forms of user identification information. These session identifiers allow the hacker to acquire the user sensitive operation and data at the server terminal.

The attacker injects malicious script codes to a website, such that the website can acquire the session data of the user, thus acquiring the user data, such as form-submitted data. Therefore, when defending against the XSS attack, protecting the security of these session data is very important.

In this embodiment, performing XSS prevention processing on the request message based on the XSS prevention component to acquire intercepted request thread data is that the request message is reviewed by using the configured XSS prevention component, and the thread data corresponding to the intercepted request thread data is acquired.

In this embodiment, the request result is that the corresponding request message intercepted is hinted to the client.

In this embodiment, the component is achieved through pure back-end components based on a Java language and a Spring technology stack, and XSS processing on the request parameter with the character string type in url and body (Json and Form) can be quickly implemented based on the component Java Web application. The main content of the component is divided into a basic component and a Spring Boot Stater:

Basic component, a component generality ability provided based on Spring;
1. Mode configuration, suitable for Url and Body transfer parameter scenarios, and support configuration translation, check and clear modes. Taking a code transfer parameter "<script>alert ("XSS-code");</script>" as an example, the code under the translation mode will be processed as "<script>alert ("XSS-code");</script>", and this parameter format does not support direct execution on the browser, thus playing a role in preventing the XSS attack; in the check mode, parameters of code will be cleared, and a code value is null; and in the check mode, whether or not the transfer parameter is an executable script will be checked, and if so, an exception is thrown;
2. Routing control, the intercepted routing and release routing may be configured. The following parameters are configured in a project configuration file:
baa application-security.XSS.path-pattern:/*# intercepted routing
baa.application-security.XSS.path-exclude-pattern: # the release routing is defaulted as to be null
A routing configuration process needs to be supplemented;
3. Personalized configuration: whether or not to remove text leading and trailing spaces and reserve linefeed may be configured;
4. Custom clearing XSS extension: if built-in XSS clearing rules do not meet needs, XSSCleaner may be implemented by its own, that is, Spring bean is registered;
5. Class/method ignore annotation: this annotation is the supplement of the routing control, and the developer can implement the ignore control of the class, method and field level through the class/method level ignore annotation and annotated transfer parameters;
6. Class/method processing annotation: this annotation can implement the local custom of the global configuration parameters, and the developer can implement the custom control of the class, method and field level through the class/method level custom annotation and annotated transfer parameters; and Based on the basic component, Spring Boot Stater provides a component out-of-the-box ability in a Spring boot environment, to avoid a complicated user configuration of a business system, and to implement use after importing.

The above technology has the following beneficial effects: enabling that XSS processing strategies based on the interceptor support custom configurations of classes/methods/field levels; providing a preset filter annotation, which facilitates developer realization of code-level control, such as field level ignores, field level XSS custom configuration; and providing an extended mode for the custom XSS processing, whereby the developers can implement XSS processing strategies by themselves based on specific business scenarios. When a receiving parameter is a multi-level nesting object, the field level control is supported by annotating a transfer parameter, for example, the multi-level nesting student and course objects of a Person object can implement sex, student.course.teacher fine-grained control through method level annotation and the transfer parameter @XSSIgnore (value={"sex", "student.course.teacher"}). A tag library function is implemented, and the developers can customize a particular tag that needs to be released or processed, to support the application scenarios of the rich text.

Embodiment 2

Figure 2:
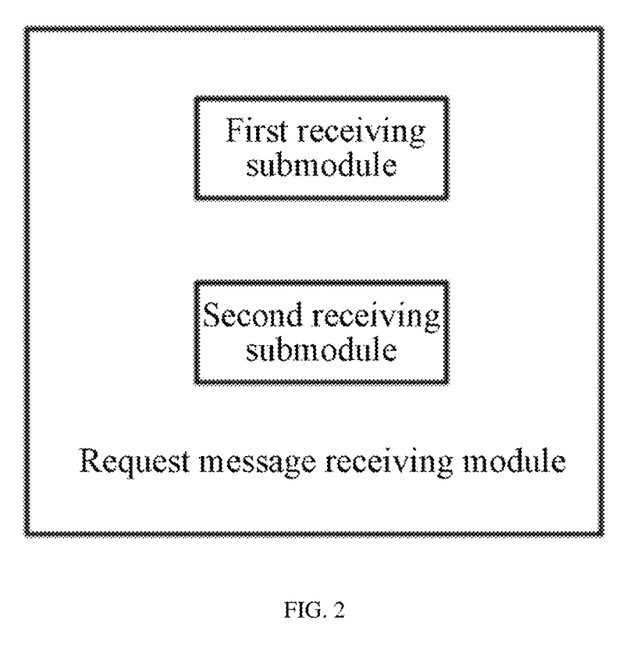
FIG. 2 is a schematic diagram of an internal function submodule of a request message receiving module in embodiments of the present disclosure.

On the basis of Embodiment 1, the request message receiving module, referring to FIG. 2, includes:
a first receiving submodule, configured to receive a request message of HTTP sent from the client; and a second receiving submodule, configured to receive a request message of a hypertext transfer protocol secure (HTTPS) sent from the client.

In this embodiment, HTTP and HTTPS are two common network request protocols, used to communicate between the client and the server. HTTP mainly pays attention to the acquisition of resources (such as a hypertext markup language (HTML) document, image, script and the like), while HTTPS is added with a security layer on the basis of HTTP, so the data may be subjected to encryption and authentication, thus ensuring the data confidentiality, integrity and reliability during communication.

The above technology has the following beneficial effects: enabling the request message receiving module to receive the request message sent by using two network request protocols.

Embodiment 3

On the basis of Embodiment 1, the thread data enable judgment module includes:

an intercept judgment submodule, configured to judge whether the interception on the request message is required or not based on the routing control strategy of the user-defined Web application interceptor and a behavior analysis and judgment result of the request message, and then to acquire an intercept judgment result;

a first judgment submodule, configured to enable the thread data when the intercept judgment result is that the interception on the request message is required, where the enable thread data serves as the thread data enable state; and a second judgment submodule, configured to not enable the thread data when the intercept judgment result is that the interception on the request message is not required, where the unenabled thread data serves as the thread data enable state.

The above technology has the following beneficial effects: further clarifying the judging whether the interception on the request message is required or not based on the routing control strategy of the user-defined Web application interceptor and a behavior analysis and judgment result of the request message, and then whether or not to enable the thread data is judged according to the interception judgment result.

Embodiment 4

On the basis of Embodiment 3, the intercept judgment submodule includes:

a behavior analysis and judgment unit, configured to perform behavior analysis and judgment on the request message, and to acquire the behavior analysis and judgment result of the request message;

a decision unit requiring interception, configured to serve the interception on the request message as an interception judgment result when the behavior analysis and judgment result of the request message is that the request message exists aggression or the routing control strategy of the Web application interceptor is hit by the request message; and a decision unit not requiring interception, configured to serve the interception not required on the request message as an interception judgment result when the behavior analysis and judgment result of the request message is that the request message does not exist aggression and the routing control strategy of the Web application interceptor is not hit by the request message.

In this embodiment, the request message hitting the routing control strategy of the Web application interceptor is that some attributes or data in the request message belong to a situation that should be intercepted by the routing control strategy of the Web application interceptor, and using the user identity of the request message belongs to a situation that should be intercepted by the routing control strategy of the Web application interceptor.

The above technology has the following beneficial effects: how to judge whether or not an implementation method for intercepting the request message is required based on the behavior analysis and judgment result of the request message and the routing control strategy of the Web application interceptor is given.

Embodiment 5

On the basis of Embodiment 4, the behavior analysis and judgment unit includes:

a step aggression assessment subunit, configured to perform an aggression assessment on each execution step in a request execution task of the request message, and to acquire an attack performance value of each execution step in the request message;

an aggression step primary subunit, configured to serve an execution step that the attack performance value in the request execution task exceeds an attack performance threshold as a suspected attack behavior step;

a logic tree building subunit, configured to determine an execution logic tree of the request execution task based on execution logics of all execution steps in the request execution task;

a comprehensive attack performance assessment subunit, configured to assess a comprehensive attack performance value of the request execution task of the request message based on distribution characteristics and attack performance values of all suspected attack behavior steps of the request execution task in the execution logic tree;

a first behavior analysis and decision subunit, configured to serve the request message existing aggression as the behavior analysis and judgment result of the request message when a comprehensive attack performance value of the request execution task of the request message is not less than a comprehensive attack performance threshold; and a second behavior analysis and decision subunit, configured to serve the request message not existing aggression as the behavior analysis and judgment result of the request message when the comprehensive attack performance value of the request execution task of the request message is less than the comprehensive attack performance threshold.

In this embodiment, the attack performance value indicates an attack size numerical value possibly existing in a single execution step (or indicating the numerical value of the risk level of the single execution step).

In this embodiment, the execution step is quantized at a user-defined quantization level, the less the content contained in the execution step, the more accurate the assessment result of the comprehensive attack performance value of the request execution task of the request packet, and vice versa.

In this embodiment, the attack performance threshold is a threshold that the attack performance value of the suspected attack behavior step exceeds.

In this embodiment, the execution logic contains the execution sequence of the execution step, the source of the execution object (i.e., the data applied by this execution step), etc., for example, the execution sequences of the three execution steps are the execution sequence A, execution sequence B and execution sequence C, the execution step B is a child node of the execution step A, and the execution step C is a child node of the execution step B; for another example, both the execution steps B and C adopt data output from the execution step A, both the execution steps B and C are child nodes of the execution step A, and if a relationship determined by the execution sequence and the source of the execution object exists conflict when considering the execution logic, the final execution logic determined by the execution sequence is prioritized.

In this embodiment, the execution logic tree is built by using the execution logics of all execution steps in the request execution task, indicating the tree structure of an affiliation relationship or a precedence relationship in the execution logic.

In this embodiment, the request execution task is the execution task, requested to the system, in the request message, for example, downloading a data package A, or accessing a subsystem Q in the system.

In this embodiment, the distribution characteristic is mainly the level continuous distribution situation of the suspected attack behavior step in the execution logic tree.

In this embodiment, the comprehensive attack performance value is a numerical value indicating the attack size possibly existing in the request execution task of the request message.

In this embodiment, the comprehensive attack performance threshold is a threshold that the comprehensive attack performance value of the request execution task of the corresponding request message is not less than when the request message existing aggression serves as the behavior analysis and judgment result of the request message.

The above technology has the following beneficial effects: through the assessment result for the aggression of each execution step in the request execution task of the request message, the suspected attack behavior step is screened, the execution logics of all execution steps in the request execution task are further analyzed and represented in a tree structure, the personalized analysis of the comprehensive attack performance of the request execution task in the request message is achieved based on the distribution characteristic and the corresponding attack performance value of the suspected attack behavior step in the execution logic tree, and a stricter review mechanism is provided to an aggression hidden danger possibly existing in the request message by comparing the comprehensive attack performance threshold to the comprehensive attack performance value, further reducing a possibility that the system is attacked.

Embodiment 6

On the basis of Embodiment 5, the step aggression assessment subunit includes:
- an assessment model building end, configured to acquire a preset step aggression assessment model; and
- a step aggression assessment end, configured to input each execution step of the request execution task in the request message to the preset step aggression assessment model, to acquire an attack performance value of each execution step in the request message.

In this embodiment, the preset step aggression assessment model is a model obtained in advance based on a machine learning algorithm and by training a great number of execution steps using manually marked corresponding attack performance value.

The above technology has the following beneficial effects: the introduction of the preset step aggression assessment model achieves the accurate assessment for the attack performance value of each execution step in the request message.

Embodiment 7

On the basis of Embodiment 5, the comprehensive attack performance assessment subunit includes:
- a tree structural topology screening end, configured to determine all suspected attack behavior step topological structures with maximally continuous levels when executing all topological sorting in the logic tree;
- an assessment weight determination end, configured to serve a quotient (MAX-MIN)/MAX of a difference value (MAX-MIN) between a maximum level number MAX of the execution logic tree and a minimum level tree MIN in each suspected attack behavior step topological structure with the maximum level number MAX of the execution logic tree as an aggression assessment weight of each suspected attack behavior step topological structure;
- a subcomprehensive attack performance determination end, configured to serve a product wxALL of a sum ALL of attack performance values of all suspected attack behavior steps in each suspected attack behavior step topological structure with the corresponding aggression assessment weight w as a subcomprehensive attack performance value of each suspected attack behavior step topological structure; and
- a comprehensive attack performance determination end, configured to serve a sum of the subcomprehensive attack performance values of all suspected attack behavior step topological structures in the execution logic tree as the comprehensive attack performance value of the request execution task of the request message.

In this embodiment, the topological sorting is that a node between the adjacent levels is a mutual parent-child relationship unidirectional extension structure, and the node (the corresponding execution step) of each level in the topological sorting has one only.

In this embodiment, the maximum level continuity is that both the front adjacent node (the corresponding execution step) of the first node (the corresponding execution step) in the topological structure of each suspected attack behavior step in the affiliated topological sequence, and the rear adjacent node (the corresponding execution step) of the final node (the corresponding execution step) in the topological structure of the suspected attack behavior step in the affiliated topological sequence are not suspected attack behavior steps.

In this embodiment, the topological structure of the suspected attack behavior step is a structure composed of a plurality of nodes (the corresponding execution step) with the maximum level continuity included in the topological sequence.

In this embodiment, the aggression assessment weight represents a proportion of a sum of the attack performance values of all suspected attack behavior steps in the topological structure of the suspected attack behavior step in the comprehensive attack performance value of the request execution task of the request message.

In this embodiment, the subcomprehensive attack performance value represents a partial numerical value, determined by the topological structure of the single suspected attack behavior step, in the comprehensive attack performance value of the request execution task in the request message.

The above technology has the following beneficial effects: a method for calculating the comprehensive attack performance value of the request execution task of the request message by using the distribution characteristic and the attack performance value of the suspected attack behavior step in the execution logic tree is given; and by unifying the aggression assessment weight of the suspected attack behavior step in the topological structure of the suspected attack behavior step with the maximum level continuity in all topological sorting in the execution logic tree and taking the maximum aggression assessment weight, the influence of the existence of continuity of the suspected attack behavior step in the overall request execution task on the comprehensive attack performance value is considered, and the accuracy of the comprehensive attack performance value of the request execution task in the calculated request message is improved.

Embodiment 8

On the basis of Embodiment 1, the annotation retrieval and storage module includes:
- a class inspection submodule, configured to judge whether a @XSS annotation or/and a @XSSIgnore annotation in the preset filter annotation exists in the class involved in the request message or not, if so, a thread local variable object in a subclass of a ThreadLocal type is called from a thread data pool; and
- a gradual storage submodule, configured to store the @XSS annotation or/and the @XSSIgnore annotation existing in the class involved in the request message in current thread data in a key-value pair mapping set of the thread local variable object of the ThreadLocal type, and to obtain the final thread data.

In this embodiment, the two annotations @XSS and @XSSIgnore are both related to the prevention of the XSS (Cross-Site Scripting) attack in a Web security domain. Both they are a part for configuring the security filter class of the request parameter in a Spring Security frame;
1. @XSS: this annotation is used to prohibit the submission of a field including a XSS attack code. When the @XSS annotation is enabled on a form or other input controls, these input controls will be cleared automatically, to remove any invalid input that may trigger an XSS attack. Thus, the server terminal will not execute these malicious inputs when rendering a page, so as to reduce a risk of XSS vulnerabilities.
2. @XSSIgnore: similar to @XSS, the function of the @XSSIgnore annotation is also to prevent the XSS attack. However, different from @ XSS, the @XSSIgnore annotation will ignore some special types of XSS attacks, allowing these attack behaviors to be approved. When the @XSSIgnore annotation is used in your project, even the XSS attack exists in these specified places, the prevention of the security filter will not be triggered. Whether or not to enable the XSS attack ignore for these locations is decided according to specific scenarios;

In a word, both the annotations are effective means to prevent the XSS attack, which can help you to reduce the risk of the Web application being attacked during development; these two annotations are used to prevent the XSS attack in the Spring Security frame, with the common purpose of processing the input contents under the conditions of the form input controls and the like, so as to avoid the potential risk caused by the operation of the malicious scripts in the user browser.

In this embodiment, the thread data pool has a type of ThreadLocal<Map<String, Object>>, the key in the Map<String, Object> is the current thread, and the value is used to store the annotation and the annotation parameter.

The above technology has the following beneficial effects: two detail annotation forms of the preset filter annotation are defined.

Embodiment 9

On the basis of Embodiment 1, the component creation module includes:
- a first creation submodule, configured to generate a XSS prevention component based on the preset filter annotation stored in the thread data, a creation method level XSSConfig object and a method level XSSConfig object when the enabling of the thread data is judged based on the thread data enable state at parameter formatting or deserialization; and
- a second creation submodule, configured to generate a XSS prevention component based on a Java Web default global XSS configuration when the unenabling of the thread data is judged based on the thread data enable state at parameter formatting or deserialization.

In this embodiment, creating a method level XSSConfig object based on the preset filter annotation stored in the thread data and generating the XSS prevention component based on the method level XSSConfig object include:
  specific implementation steps of creating a method level XSSConfig object based on the preset filter annotation stored in the thread data and generating the specific XSS prevention component based on the method level XSSConfig object are as follows:
  1. First, the configuration file is read, to obtain the preset filter annotations. These annotations may be included in the configuration class of the application program, or may be included in a separate XML or JSON file;
  2. A XSSConfig object is created according to the preset filter annotations. This object includes all preset filtering rules, including a URL mode required to be intercepted, a request header, etc.;
  3. For each request, the rule array of the XSSConfig object is traversed. For each rule, whether or not the requested URI matches with the rule is judged, if so, the corresponding operation is executed. This includes some common operations, such as modification for the request header and addition of the XSS prevention filtering;
  4. If the request matches with a certain rule, but this rule is not required to execute any operation, the request is forwarded directly;
  5. If the request matches with a certain rule, and this rule is required to execute some operations, such as coding the request body, these operations are executed. The processing of the request body is usually required, for example, the request body is subjected to HTML substantialization, to prevent the malicious code from being injected to the server terminal;
  6. If any one rule is not matched after all rules are processed, indicating this request does not contain the XSS vulnerability, and the request is directly forwarded to the back end for processing; and
  7. Finally, the request is forwarded to the back end, thus completing the overall process.

In this embodiment, the XSS prevention component is generated based on the Java Web default overall XSS configuration, for example, based on the JavaWeb platform, the input parameters is subjected to XSS filtering and prevention (i.e., generate the XSS prevention component) by using a regular expression, with the specific implementation steps as follows:
  1. A class named XSSFilter is created, and this class expands an AbstractFilterBean class. In the construction method of the class, a character set that needs to be filtered is defined by using an init method, and a default attribute value is set;
  2. In a web.xml file, XSSFilter' is registered, and the name and sequence of the filter are appointed;

3. When the request reaches, first the request is checked whether to be a XSS request or not, and if so, the default filter is used for processing. If the request is the XSS request, the self-defined XSSFilter is used to process the request;
4. The isXSSRequest method is implemented to judge whether the request header includes a specific XSS attack indicator or not, such as X-Doctor-Test or X-Attack-Target. If so, indicating that the request may exist the XSS attack risk, and the user-defined XSSFilter needs to be called for filtering and processing;
5. To prevent a reflection attack, an -XSS-Check field may be added to the request header, and the value of the field is a 128-bit MD5 encrypted random number. After receiving the request, the server will verify whether the field is equal to 128 or not;

Through the above steps, we can implement a simple XSS prevention component, to prevent the application program on the Java Web from the XSS attack.

The above technology has the following beneficial effects: the XSS prevention component generation method for two situations (judge the enabled thread data based on the thread data enable state and judge the unenabled thread data based on the thread data enable state) is given.

Embodiment 10

Figure 3:
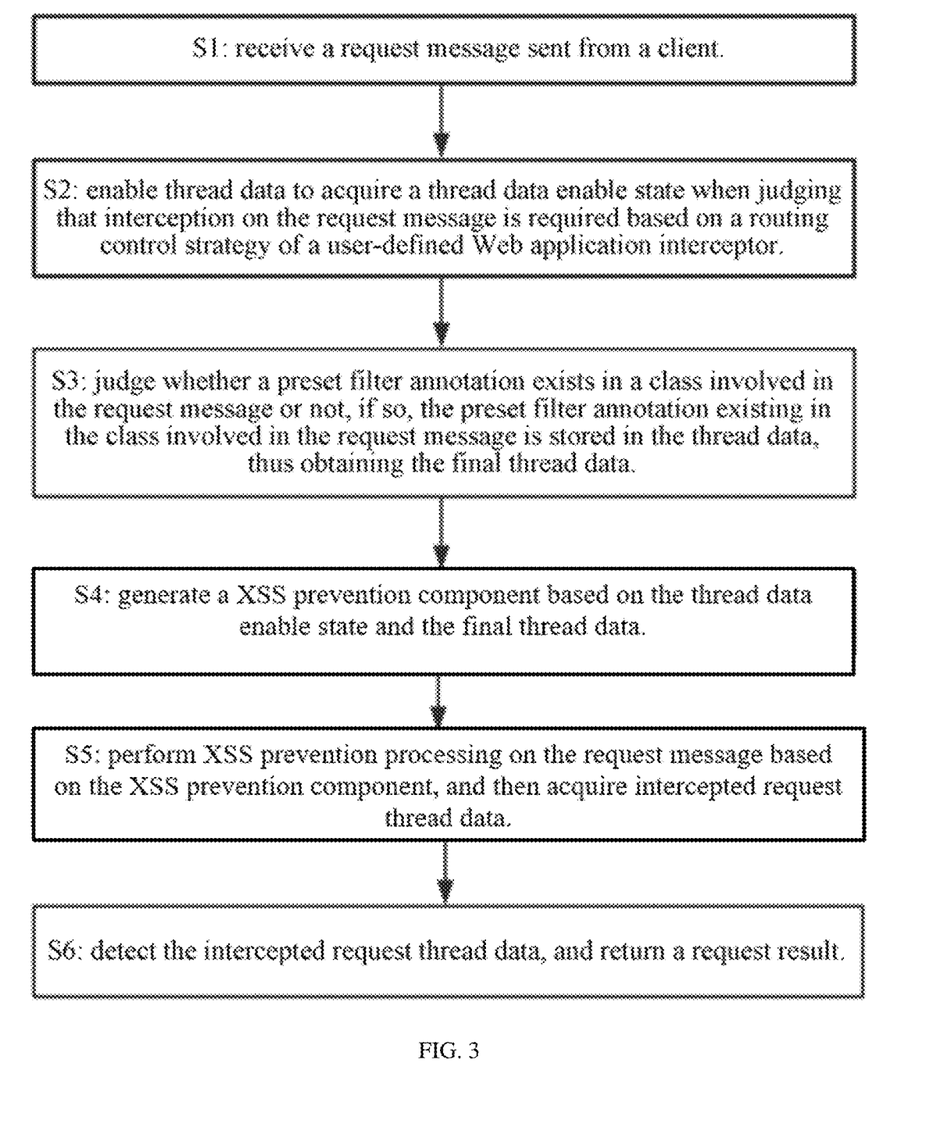
FIG. 3 is a flowchart of a method for achieving system XSS prevention in a componentized form in embodiments of the present disclosure.

The present disclosure provides a method for achieving system XSS prevention in a componentized form, applied in the system for achieving system XSS prevention in a componentized form according to any one of embodiments 1 to 9, and referring to FIG. 3, the method includes:

S1: receiving a request message sent from a client;
S2: enabling thread data to acquire a thread data enable state when interception required to the request message is judged based on a routing control strategy of a user-defined Web application interceptor;
S3: judging whether a preset filter annotation exists in a class involved in the request message or not, if so, the preset filter annotation existing in the class involved in the request message is stored in the thread data, thus obtaining the final thread data;
S4: generating a XSS prevention component based on the thread data enable state and the final thread data;
S5: performing XSS prevention processing on the request message based on the XSS prevention component, and then acquiring intercepted request thread data; and
S6: detecting the intercepted request thread data, and returning a request result.

The above technology has the following beneficial effects: enabling that XSS processing strategies based on the interceptor support custom configurations of classes/methods/field levels; providing a preset filter annotation, which facilitates developer realization of code-level control, such as field level ignores, field level XSS custom configuration; and providing an extended mode for the custom XSS processing, whereby the developers can implement XSS processing strategies by themselves based on specific business scenarios. When a receiving parameter is a multi-level nesting object, the field level control is supported by annotating a transfer parameter, for example, the multi-level nesting student and course objects of a Person object can implement sex, student.course.teacher fine-grained control through method level annotation and the transfer parameter @XSSIgnore (value={"sex", "student.course.teacher"}). A tag library function is implemented, and the developers can customize a particular tag that needs to be released or processed, to support the application scenarios of the rich text.

It is apparent that those skilled in the art may make any modification and variation to the present disclosure without deviating from the spirit and scope of the present disclosure. Thus, if these modifications and variations of the present disclosure belong to the scope of the claims and equivalent technology thereof of the present disclosure, the present disclosure is intended to include these modifications and variations.

What is claimed is:

1. A system for achieving system cross-site scripting (XSS) prevention in a componentized form, comprising a processor and a memory, wherein the processor is configured for:
    enabling thread data to acquire a thread data enable state when judging that interception on the request message is required based on a routing control strategy of a user-defined Web application interceptor deployed at a server terminal and a behavior analysis and judgment result of the request message;
    judging whether a preset filter annotation exists in a class involved in the request message or not, if so, the preset filter annotation existing in the class involved in the request message being stored in the thread data, thus obtaining the final thread data;
    generating a XSS prevention component based on the thread data enable state and the final thread data;
    wherein the enabling thread data to acquire a thread data enable state when judging that interception on the request message is required based on a routing control strategy of a user-defined Web application interceptor deployed at a server terminal and a behavior analysis and judgment result of the request message comprises:
    performing an aggression assessment on each execution step in a request execution task of the request message, and acquiring an attack performance value of each execution step in the request message;
    serving an execution step that the attack performance value in the request execution task exceeds an attack performance threshold as a suspected attack behavior step;
    determining an execution logic tree of the request execution task based on execution logics of all execution steps in the request execution task;
    assessing a comprehensive attack performance value of the request execution task of the request message based on distribution characteristics and attack performance values of all suspected attack behavior steps of the request execution task in the execution logic tree;
    acquiring a behavior analysis and judgment result of the request message based on the comprehensive attack performance value of the request execution task of the request message;
    wherein the judging whether a preset filter annotation exists in a class involved in the request message or not, if so, the preset filter annotation existing in the class involved in the request message being stored in the thread data, thus obtaining the final thread data comprises:
    judging whether a @XSS annotation or/and a @XSSIgnore annotation in the preset filter annotation exists in the class involved in the request message or not, if so, a thread local variable object in a subclass of a ThreadLocal type being called from a thread data pool;

storing the @XSS annotation or/and the @XSSIgnore annotation existing in the class involved in the request message in current thread data in a key-value pair mapping set of the thread local variable object of the ThreadLocal type, and obtaining the final thread data;
wherein the generating a XSS prevention component based on the thread data enable state and the final thread data comprises:
generating a XSS prevention component based on the preset filter annotation stored in the thread data, a creation method level XSSConfig object and a method level XSSConfig object when the enabling of the thread data is judged based on the thread data enable state at parameter formatting or deserialization; and
generating a XSS prevention component based on a Java Web default global XSS configuration when the unenabling of the thread data is judged based on the thread data enable state at parameter formatting or deserialization.

2. The system for achieving system XSS prevention in the componentized form according to claim 1, wherein the processor is further configured for:
receiving a request message of a hypertext transfer protocol (HTTP) sent from the client; and
receiving a request message of a hypertext transfer protocol secure (HTTPS) sent from the client.

3. The system for achieving system XSS prevention in the componentized form according to claim 1, wherein the enabling thread data to acquire a thread data enable state when judging that interception on the request message is required based on a routing control strategy of a user-defined Web application interceptor deployed at a server terminal and a behavior analysis and judgment result of the request message comprises:
judging whether the interception on the request message is required or not based on the routing control strategy of the user-defined Web application interceptor and a behavior analysis and judgment result of the request message, and then acquiring an intercept judgment result;
enabling the thread data when the intercept judgment result is that the interception on the request message is required, wherein the enable thread data serves as the thread data enable state; and
disenabling the thread data when the intercept judgment result is that the interception on the request message is not required, wherein the unenabled thread data serves as the thread data enable state.

4. The system for achieving system XSS prevention in the componentized form according to claim 3, wherein the judging whether the interception on the request message is required or not based on the routing control strategy of the user-defined Web application interceptor and a behavior analysis and judgment result of the request message, and then acquiring an intercept judgment result comprises:
performing behavior analysis and judgment on the request message, and acquiring the behavior analysis and judgment result of the request message;
serving the interception on the request message as an interception judgment result when the behavior analysis and judgment result of the request message is that the request message exists aggression or the routing control strategy of the Web application interceptor is hit by the request message; and
serving the interception not required on the request message as an interception judgment result when the behavior analysis and judgment result of the request message is that the request message does not exist aggression and the routing control strategy of the Web application interceptor is not hit by the request message.

5. The system for achieving system XSS prevention in the componentized form according to claim 1, wherein the acquiring a behavior analysis and judgment result of the request message based on the comprehensive attack performance value of the request execution task of the request message comprises:
serving the request message existing aggression as the behavior analysis and judgment result of the request message when a comprehensive attack performance value of the request execution task of the request message is not less than a comprehensive attack performance threshold; and
serving the request message not existing aggression as the behavior analysis and judgment result of the request message when the comprehensive attack performance value of the request execution task of the request message is less than the comprehensive attack performance threshold.

6. The system for achieving system XSS prevention in the componentized form according to claim 1, wherein the performing an aggression assessment on each execution step in a request execution task of the request message, and acquiring an attack performance value of each execution step in the request message comprises:
acquiring a preset step aggression assessment model; and
inputting each execution step of the request execution task in the request message to the preset step aggression assessment model, to acquire an attack performance value of each execution step in the request message.

7. The system for achieving system XSS prevention in the componentized form according to claim 1, wherein the assessing a comprehensive attack performance value of the request execution task of the request message based on distribution characteristics and attack performance values of all suspected attack behavior steps of the request execution task in the execution logic tree comprises:
determining all suspected attack behavior step topological structures with maximally continuous levels when executing all topological sorting in the logic tree;
serving a quotient of a difference value between a maximum level number of the execution logic tree and a minimum level tree in each suspected attack behavior step topological structure with the maximum level number of the execution logic tree as an aggression assessment weight of each suspected attack behavior step topological structure;
serving a product of a sum of attack performance values of all suspected attack behavior steps in each suspected attack behavior step topological structure with the corresponding aggression assessment weight as a subcomprehensive attack performance value of each suspected attack behavior step topological structure; and
serving a sum of the subcomprehensive attack performance values of all suspected attack behavior step topological structures in the execution logic tree as the comprehensive attack performance value of the request execution task of the request message.

8. A method for achieving system XSS prevention in a componentized form, wherein the method is applied in the system for achieving system XSS prevention in the componentized form according to claim 1, and the method comprises:
receiving a request message sent from a client;

enabling thread data to acquire a thread data enable state when judging that interception on the request message is required based on a routing control strategy of a user-defined Web application interceptor deployed at the server terminal and a behavior analysis and judgment result of the request message;

judging whether a preset filter annotation exists in a class involved in the request message or not, if so, the preset filter annotation existing in the class involved in the request message being stored in the thread data, thus obtaining the final thread data;

generating a XSS prevention component based on the thread data enable state and the final thread data;

performing XSS prevention processing on the request message based on the XSS prevention component, and then acquiring intercepted request thread data; and detecting the intercepted request thread data, and returning a request result.

\* \* \* \* \*